US005504287A

United States Patent [19]

Cable

[11] Patent Number: 5,504,287

[45] Date of Patent: Apr. 2, 1996

[54] TILT RESPONSIVE UNDERHOOD LAMP SWITCH ASSEMBLY

[75] Inventor: Albert B. Cable, Springfield, Ill.

[73] Assignee: Stewart-Warner Hobbs Corporation, Springfield, Ill.

[21] Appl. No.: 339,830

[22] Filed: Nov. 15, 1994

[51] Int. Cl.[6] .......................... H01H 35/02; G03B 31/00

[52] U.S. Cl. .................................... 200/61.52; 200/61.83; 362/80; 362/802

[58] Field of Search ......................... 200/61.45 R, 61.52, 200/61.62, 61.76–61.82, 61.83, DIG. 29; 346/429, 438, 440, 457, 458; 362/61, 66, 80, 71, 802

[56] References Cited

U.S. PATENT DOCUMENTS

| | | | |
|---|---|---|---|
| 1,391,782 | 9/1921 | McDannold | 200/61.48 |
| 1,911,621 | 5/1933 | Holmgren | 200/61.63 |
| 2,206,094 | 7/1940 | Hobbs | 362/80 |
| 2,228,456 | 1/1941 | Hobbs | 362/155 |
| 2,601,142 | 6/1952 | Hubbard | 315/32 |
| 4,104,492 | 8/1978 | Pliml, Jr. | 200/61.52 X |
| 4,467,154 | 8/1984 | Hill | 200/61.45 R |
| 4,629,841 | 12/1986 | Riback et al. | 200/153 A |
| 4,956,629 | 9/1990 | Chen | 340/429 |
| 5,155,308 | 10/1992 | Blair | 200/61.52 |

FOREIGN PATENT DOCUMENTS

| | | | |
|---|---|---|---|
| 86414 | 7/1895 | Germany | H01H 35/02 |
| 1287675 | 1/1969 | Germany | H01H 35/02 |
| 1145955 | 3/1969 | United Kingdom | H01H 35/02 |

*Primary Examiner*—J. R. Scott
*Attorney, Agent, or Firm*—Lorusso & Loud

[57] ABSTRACT

A lamp assembly for use in an automotive applications which contains a switching assembly and a light bulb. The assembly may be mounted on the underside of an automobile hood or trunk and illuminates on angular movement of the hood or trunk. The switching assembly operates through the movement of a sphere within a tube which rests on a pivot block. The movement of the sphere within the tube causes a contact to engage and disengage from two terminals of a bridge switch. When the trunk or hood is closed the contact is disengaged and the light bulb is off. However, when the assembly is rotated 26° from its position when the trunk or hood is closed, the contact bridges the terminals of the bridge switch and the light bulb illuminates. The contact disengages as the trunk or hood closes past 26° and before 10° from its closed position, and the bulb turns off.

8 Claims, 2 Drawing Sheets

TILT RESPONSIVE UNDERHOOD LAMP SWITCH ASSEMBLY

FIELD OF THE INVENTION

The present invention relates to a lamp assembly which is particularly suited for use in automotive applications. The assembly includes a light bulb and a switching assembly which causes the bulb to illuminate with angular movement.

BACKGROUND OF THE INVENTION

Many types of switches which are activated and deactivated with angular movement are well known to those skilled in the art. Perhaps the most common of these switches is the mercury tilt switch which uses a globule of mercury in a sealed vial to conductively bridge two contacts. As the vial is tilted, the mercury moves from one end of the vial to the other end thereby moving in and out of engagement with the contacts.

Mercury tilt switches have been effectively used for years in many applications. However, due to the toxicity of mercury these switches have been disfavored where severe applications involving vibration, thermal changes, and sever shock are expected. In fact, many automobile manufacturers now require that the lamp assemblies used in their automobiles not contain mercury in view of the environmental risks involved.

Accordingly, the art has turned to several alternatives. One solution is disclosed in U.S. Pat. No. 5,155,308 ("the '308 patent") to Blair which issued on Oct. 13, 1992. The device taught in the '308 patent uses a rolling sphere which is movable on a horizontal planar surface or lever. The lever is placed on a fulcrum point fixed to a support member. Movement of the sphere on the lever causes engagement and disengagement of contacts located on the lever and the support member to complete a circuit.

Several disadvantages associated with the design of the '308 patent have been recognized, particularly if the design were to be used in severe applications. First, a dual circuit point contact arrangement as used in the '308 patent is susceptible to contamination resulting from vibration or arcing which reduces the useful life of the switch. Vibration and contamination can also affect the flow of current through the fulcrum point on the support member, and cause contact wear or chatter between the contacts on the lever and support member.

In addition, the movement of the lever in relation to the support member causes the contact placed on the lever to be forced down on the support member contact in an angular relationship. This wiping down of one contact on the other results in friction between the contacts causing them to stick upon reverse movement of the sphere. As a result, the angular differential between engagement and disengagement of the switch is increased.

Finally, the device disclosed in the '308 patent must be integrated into the housing of a lamp assembly if it is to be used in a lighting device. This complicates the assembly and adjustment processes, and significantly adds to the expense of a lamp assembly incorporating the switch.

OBJECTS OF THE INVENTION

Accordingly, it is an object of the present invention to provide a lamp assembly including a tilt switch for use in automotive applications wherein the tilt switch is mercury free and is integrated into the housing of the lamp assembly.

Another object of the present invention is to provide a lamp assembly including a tilt switch which is of single circuit design, thereby eliminating contact wear and chatter resulting from vibration.

Still another object of the present invention is to provide a lamp assembly including a tilt switch for use in automotive applications wherein the switch has a large rotating contact surface thereby increasing contact life.

Yet another object of the present invention is to provide a lamp assembly including a tilt switch for use in automotive applications wherein a linear contact force is supplied to a bridge contact thereby eliminating friction between the contacts.

SUMMARY OF THE INVENTION

The present invention relates to a lamp assembly for use in automotive applications. The assembly includes a switching assembly located within a housing and a light bulb. The switching assembly includes a tube which is attached to one side of a pivot block. One end of a contact arm is also attached to the pivot block while the other end of the contact arm extends to the other side of the tube.

A roller contact is fixed to the second end of the contact arm adjacent to two bridge switch terminals. In the preferred embodiment, the contact arm extends from the pivot block perpendicular to the bridge switch terminals. The roller contact bridges a space between the switch terminals when it is in a closed position, and is separated from the terminals when it is in an open position. The roller contact is about 0.200 inches in length and contacts the two terminals of the bridge switch over its entire length when the contact is in the closed position.

The roller contact is moved in and out of the open and closed positions by the movement of a sphere within the tube. When the assembly is in a normal position, i.e. mounted on an automobile hood or trunk door which is closed, the sphere is gravitationally forced against one end of the tube which is closed by an end cap. In this normal position the light bulb is off.

However, when the automobile hood or trunk door is opened, the sphere is gravitationally forced along the length of said tube toward the other end of the tube which is also closed by an end cap. As the sphere moves to this end, the roller contact moves from the open position to the closed position. When the housing is rotated more than 26 degrees from its normal position, the contact is fully closed and the light bulb is illuminated.

When the automobile hood or trunk is closed, the sphere moves back along the tube to its position when the housing is in the normal position. As the sphere moves back to this end of the tube, the roller contact moves from the closed position to the open position. The roller contact is fully open when the housing rotates toward its normal position in the plane of the contact arm to an angle in the range of 26 degrees to 10 degrees relative to its normal position.

The assembly also includes a rubber stop mounted on the housing. A portion of the tube adjacent to the second end cap rests against the rubber stop when the housing is in the normal position. Finally, a mounting assembly is also included on the assembly for mounting the assembly to an automobile hood or trunk door.

BRIEF DESCRIPTION OF THE DRAWINGS

A preferred embodiment of the invention is described below with reference to the following figures wherein like numerals representive like parts.

DETAILED DESCRIPTION OF THE INVENTION

Figure 1:
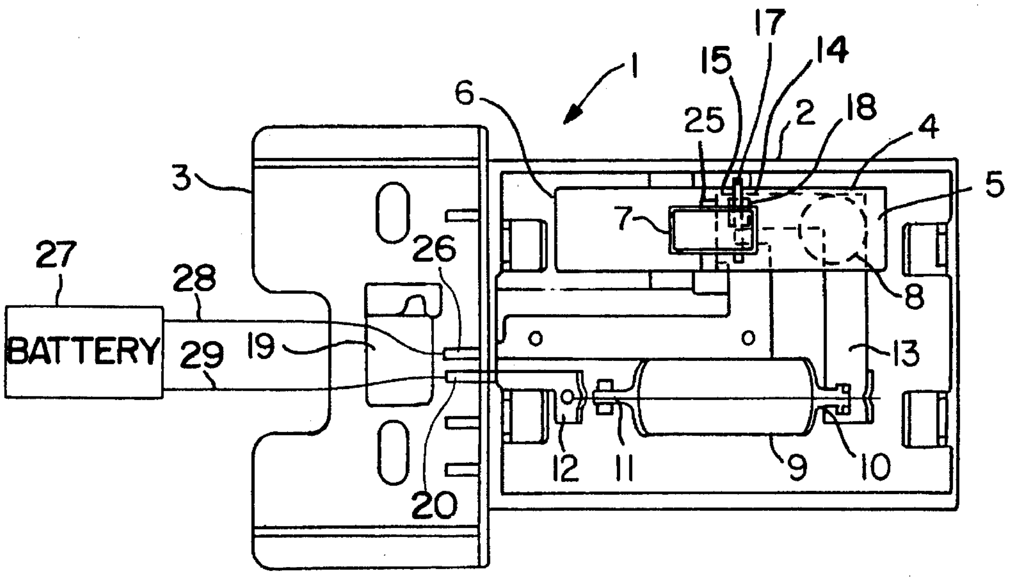
FIG. 1: is a bottom view of a preferred embodiment of a lamp assembly according to the present invention.

Referring to FIG. 1, a preferred embodiment of a lamp assembly 1 according to the present invention is shown in which all of the elements of the assembly are enclosed within a housing 2. A mounting assembly 3 is attached to the housing for mounting the lamp assembly to the underside of an automobile hood or trunk. A tube 4 having two end seals 5,6 is mounted on a pivot block 7 which pivots on a pivot pin 25. A sphere 8 is located within the tube and is free to move along its length under the force of gravity. A bulb 9 is mounted within the housing on two terminals 12 and 13. The power source for the bulb is the automobile battery 27. Two leads 28,29 extend from the battery to the housing, one from each battery terminal. In the preferred embodiment, a generally available Packard connector receptacle 19 is molded into the housing and provides a sealed connection for the battery leads.

One of the battery leads 29, either positive or negative, is electrically connected through terminal 20 (FIG. 2A–2C) and terminal 12 to one end 11 of the bulb. The other end 10 of the bulb is electrically connected through terminal 13 to one terminal 14 of a bridge switch shown in FIG. 2A. The remaining battery lead 28 is electrically connected through terminal 26 to the other terminal 15 of the bridge switch. When the bridge is closed, the bulb is illuminated by the automobile battery 27.

Figure 2A:
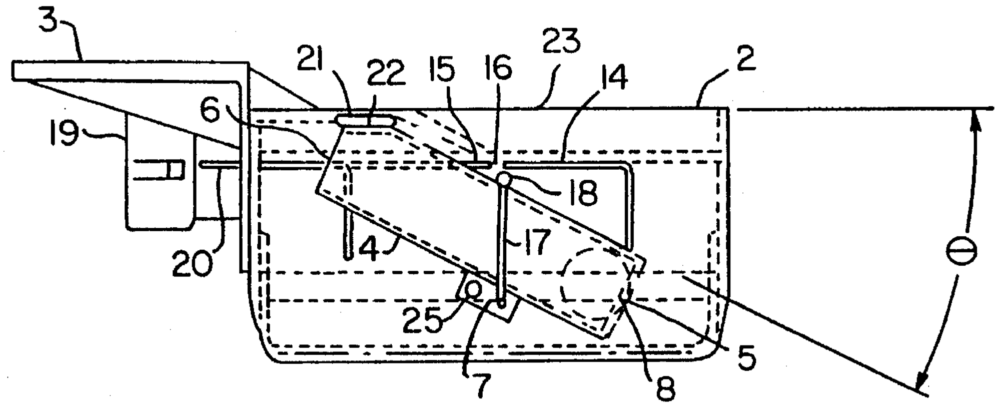
FIG. 2A–2C: illustrate the mechanical operation of the preferred embodiment of the present invention as sequential steps.

Referring still to FIG. 2A, a gap 16 between the electrical terminals 14,15 of the bridge switch is closed through the action of a contact arm 17 attached to the pivot block 7. The contact arm contains a roller contact 18 attached to its end for closing the gap between the terminals of the bridge. The roller contact is preferably formed of a conductive metal tube, e.g. brass, which rolls on the end of the contact arm. The length of the roller contact is substantial compared to commonly used point contacts, and approximates the width of the terminals forming the bridge switch. In the preferred embodiment the roller contact length is about 0.200" while the width of the bridge switch terminals is also about 0.200".

The roller contact 18 is engaged and disengaged from the two terminals 14,15 of the switch by the movement of the sphere within the tube 4. As the sphere moves along the tube length, the tube tilts on the pivot block 7 causing the pivot arm 17 to move in a perpendicular direction with respect to the terminals 14, 15 forming the bridge switch. In the closed position, shown in FIG. 2C, the roller contact 18 is forced against the terminals of the bridge switch by the lever action of the sphere within the tube. Under ideal conditions, the contact arm will move perpendicularly to the bridge switch terminals and center the roller contact in the bridge gap.

However, minor deviations of this ideal alignment may result from the manufacturing process. Importantly, any slight deviation from the intended perpendicular alignment of the contact arm 17 with the bridge switch terminals 14,15 is corrected by the roller contact 18. If the roller contact engages one terminal, e.g 14, of the switch before engaging the other terminal, the contact rolls on the terminal forcing the contact to center itself within the bridge switch gap. Since the roller contact rolls on the terminal instead of angularly wiping down upon it, wear on the terminals is minimized.

Figure 2B:
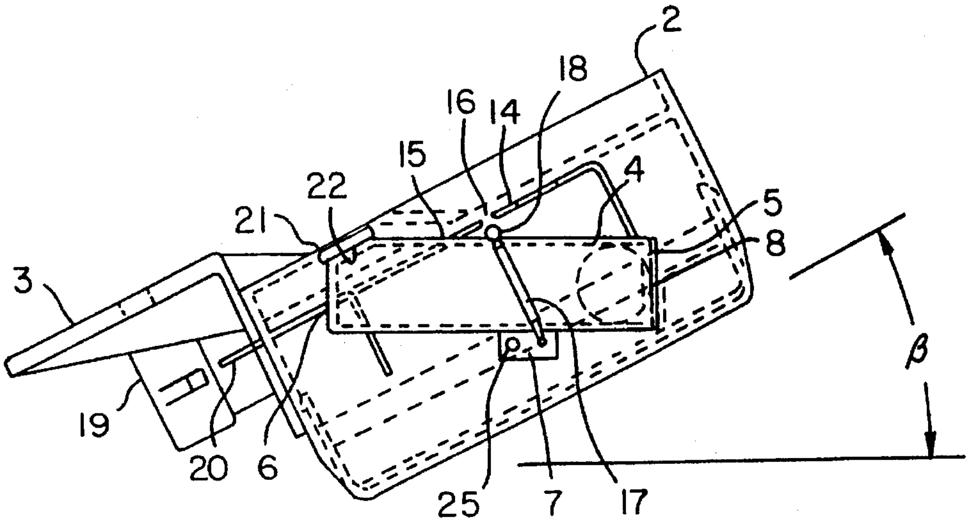
Figure 2C:
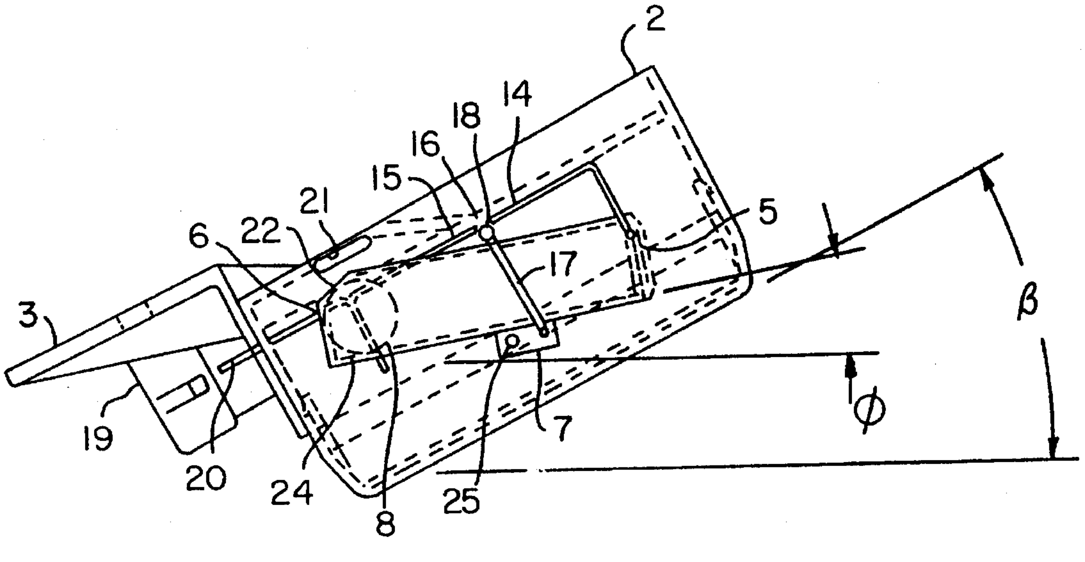

FIGS. 2A–2C illustrate the operation of the lamp assembly for different angles of rotation of the assembly housing. In the open position, FIG. 2A, the roller contact 18 is disengaged from the terminals 14,15 of the bridge switch, and the bulb is turned off. The sphere is gravitationally forced against an end seal 5, and the tube is tilted on the pivot block. The other end of the tube rests on a rubber stop 21 mounted to the housing 2. The rubber stop absorbs vibration thereby preventing chattering of the sphere within the tube during severe applications. Preferably, the corner of the tube 22 which rests on the rubber stop is beveled, as shown, to provide a large contact surface between the tube and the rubber stop.

In the normal position depicted in FIG. 2A, the lamp assembly is mounted via the mounting assembly 3 on the underside of an automobile hood or trunk which is closed. In this position, the roller contact 18 is in the open position, and the bulb is off. The angle $\Theta$ measured from the side 23 of the housing adjacent to the underside of the hood or trunk is preferably 26°. As shown in FIG. 2B, the roller contact 18 remains in the open position as the hood or trunk opens causing the bottom side of the housing to move through an angle $\beta$ of up to 26° measured from its normal position shown in FIG. 2A.

In FIG. 2C, when the angle $\beta$ exceeds 26°, the sphere 8 is gravitationally forced against the opposite end seal cap 6 of the tube. The lever action of the sphere and tube on the pivot block 7 forces the roller contact 18 into the bridge switch gap 16 through the contact arm 17. The roller contact is now in the closed position, and the bulb is illuminated.

When the roller contact is in the closed position, the angle $\phi$ of the bottom 24 of the tube which rest on the pivot block 7 is preferably 11° or more as measured from the position of the bottom 24 of the tube when the angle $\beta$ is 26° as in FIG. 2B. When the trunk or hood is closed the gravitational force on the sphere forces the sphere toward the end seal 5 upon which it rests in the normal position resulting in a decrease in the angle $\phi$. When the angle $\phi$decreases to less than 0°, the roller contact 18 moves back into open position and the bulb is turned off. This corresponds to a decrease in the angle $\beta$ to an angle of less than 16°.

In operation, the lamp assembly of the present invention is well suited for the severe conditions presented by automobile applications. The chatter on the contact surfaces of the switch is minimized since the weight of the sphere is multiplied through the lever action of the contact arm and the tube to force the roller contact 18 into the bridge switch gap 16. In addition, the perpendicular movement of the contact arm with respect to the switch terminals minimizes any friction with the roller contact. The roller contact also will center itself in the bridge gap if any deviation in the perpendicular alignment results from the manufacturing process. This feature also significantly increases contact life by minimizing friction between the contact surfaces on the terminals 14,15 and roller contact 18. The roller contact also presents a large contact surface to the terminals of the bridge switch thereby minimizing the effect of any contamination of portions of the contact surface on the operation of the switch. These and other advantages over the prior art are readily apparent in operation of the lamp assembly of the present invention.

It is appreciated that many variations and alterations of the foregoing can be made without deviating from the scope and teachings of the present invention. For example, various bulb types, roller contact dimensions, component materials, etc., may be incorporated into the lamp assembly. It is intended, therefore, to encompass all other embodiments, alternatives and modifications consistent with the present invention.

What is claimed is:

1. A lamp assembly for use in automotive applications comprising:

a housing;

a switching assembly located within said housing, said switching assembly comprising a pivot block, a tube having a first and a second side and a first and second end cap, the first side of said tube being on said pivot block, a contact arm having a first and a second end, the first end of said contact arm being attached to said pivot block, said contact arm extending from said pivot block to said second side of said tube, a roller contact fixed to the second end of said contact arm, two bridge switch terminals located adjacent said roller contact, said roller contact bridging a space between the two bridge switch terminals when said roller contact is in a closed position and being separated from the two bridge switch terminals when said roller contact is in an open position.

a sphere movably located within said tube, said sphere being gravitationally forced against the first end cap of said tube when said housing is in a normal position thereby maintaining said roller contact in the open position, and said sphere being gravitationally forced along the length of said tube toward said second end cap when said housing is rotated angularly with respect to the normal position thereby forcing the roller contact into the closed position; and a pair of terminals for receiving a light bulb, said light bulb being illuminated when said roller contact is in the closed position.

2. A lamp assembly according to claim 1, wherein said light bulb is located within said housing.

3. A lamp assembly according to claim 1 wherein said contact arm extends from said pivot block perpendicular to said two bridge switch terminals.

4. A lamp assembly according to claim 1 wherein said roller contact moves from the open position to the closed position when said housing rotates in the plane of said contact arm more than 26 degrees from its normal position.

5. A lamp assembly according to claim 1 wherein said roller contact is about 0.200 inches in length and contacts the two terminals of the bridge swatch over its entire length when said contact is in the closed position.

6. A lamp assembly according to claim 1 wherein said roller contact moves from the closed position to the open position when said housing rotates toward its normal position in the plane of said contact arm to an angle in the range of 26 degrees to 10 degrees relative to the normal position.

7. A lamp assembly according to claim 1, said lamp assembly further comprising a mounting assembly for mounting the lamp assembly to an automobile hood or trunk door.

8. A lamp assembly according to claim 1, said lamp assembly further comprising a rubber stop mounted on said housing, a portion of said tube adjacent to said second end cap being forced against said rubber stop when said housing is in the normal position.

* * * * *